US010758842B2

(12) United States Patent
Clemons

(10) Patent No.: US 10,758,842 B2
(45) Date of Patent: Sep. 1, 2020

(54) PORTABLE PETROLEUM BYPRODUCT SYSTEM FOR ELECTROCOAGULATIVE PURIFICATION BY SERPENTINE FLOW

(71) Applicant: Mountain Water Concepts, LLC, Silt, CO (US)

(72) Inventor: Nathaniel Clemons, Silt, CO (US)

(73) Assignee: Mountain Water Concepts, LLC, Silt, CO (US)

( * ) Notice: Subject to any disclaimer, the term of this patent is extended or adjusted under 35 U.S.C. 154(b) by 0 days.

(21) Appl. No.: 16/215,377

(22) Filed: Dec. 10, 2018

(65) Prior Publication Data

US 2019/0105583 A1    Apr. 11, 2019

Related U.S. Application Data

(63) Continuation of application No. 15/053,192, filed on Feb. 25, 2016, now Pat. No. 10,150,059.

(51) Int. Cl.
| | |
|---|---|
| *C02F 1/46* | (2006.01) |
| *B01D 17/06* | (2006.01) |
| *B01D 19/00* | (2006.01) |
| *C02F 1/463* | (2006.01) |
| *B01D 17/02* | (2006.01) |
| *B01D 21/26* | (2006.01) |

(Continued)

(52) U.S. Cl.
CPC ......... *B01D 17/06* (2013.01); *B01D 17/0217* (2013.01); *B01D 19/0005* (2013.01); *B01D 21/262* (2013.01); *C02F 1/463* (2013.01); *B01D 2259/80* (2013.01); *C02F 1/20* (2013.01); *C02F 1/385* (2013.01); *C02F 2201/4611* (2013.01); *C02F 2301/028* (2013.01)

(58) Field of Classification Search
CPC .. B01D 17/06; B01D 21/262; B01D 17/0217; B01D 19/0005; B01D 2259/80; C02F 1/463; C02F 2301/028; C02F 2201/4611; C02F 1/385; C02F 1/20
See application file for complete search history.

(56) References Cited

U.S. PATENT DOCUMENTS

| 8,431,009 B2 | 4/2013 | Morkovsky et al. |
| 8,486,253 B2 | 7/2013 | Tarbet et al. |

(Continued)

OTHER PUBLICATIONS

U.S. Appl. No. 15/053,192, filed Feb. 26, 2016. First named inventor: Clemons.

*Primary Examiner* — Arun S Phasge
(74) *Attorney, Agent, or Firm* — Santangelo Law Offices, P.C.

(57) ABSTRACT

Multiple site purification can be achieved by a small plastic portable voltaic inspissation unit in a box configuration. Each unit may feature an air hopper, a recirculation line, a gas diffuser, a centrifuge, a decanter, and multiple anodic and cathodic voltaic inspissation plates that may direct fluid through a box in a meandering or serpentine fashion. Multiple devices may be present or omitted, and retention times may be varied both by the presence or absence of recirculation and the flow rate accomplished by use of different metal in the plates depending on purification goals. Air may be injected interstitially prior to passage into the box to aid in purification, and ultimately both ease of transport and substantially improved purification percentages may be achieved relative to prior systems.

16 Claims, 8 Drawing Sheets

(51) Int. Cl.
*C02F 1/20* (2006.01)
*C02F 1/38* (2006.01)

(56) References Cited

U.S. PATENT DOCUMENTS

| | | | |
|---|---|---|---|
| 8,568,573 B2 | 10/2013 | Winkle et al. | |
| 8,673,129 B2 | 3/2014 | Gordon et al. | |
| 8,778,166 B2 * | 7/2014 | Miller | B01D 61/422 |
| | | | 204/275.1 |
| 8,858,790 B2 | 10/2014 | Wiemers et al. | |
| 8,858,791 B2 | 10/2014 | Wiemers | |
| 8,906,237 B2 | 12/2014 | Johnson | |
| 2008/0223731 A1 * | 9/2008 | Lee | C02F 1/463 |
| | | | 205/761 |

* cited by examiner

PORTABLE PETROLEUM BYPRODUCT SYSTEM FOR ELECTROCOAGULATIVE PURIFICATION BY SERPENTINE FLOW

This patent application is a continuation application of U.S. patent application Ser. No. 15/053,192 filed Feb. 2, 2016, and issuing as U.S. Pat. No. 10,150,059 on Dec. 11, 2018, said application is hereby incorporated by reference in its entirety herein.

BACKGROUND

The present invention relates generally to the field of electrocoagulative purification of petroleum byproducts such as fracking fluids, drilling mud fluids, and the like as arise at exploration and production of wellheads. The weaknesses of current purification methods used to attempt cleansing of fracking and other petroleum industry byproduct, as well as water cleaning in general, have been known for many years. Currently, massive pieces of equipment that must be assembled on-site and permanently installed in a given location are used. However, these techniques are generally non-portable and therefore of limited utility, especially if a site is tapped out, or other problems are encountered which render a site nonproductive. Existing systems also have shortcomings in their purification success rates, sometimes only removing 80% of particulates, oils, or other impurities once fluid has passed through them. For instance, the system described in U.S. Pat. No. 8,431,009 B2 is too large and heavy for transit between or use at multiple purification sites. The system described in U.S. Pat. No. 8,486,243 does not adequately address the possibility of recirculation to achieve better purification. The system described in U.S. Pat. No. 8,568,573 provides no means for injection of air, useful to achieve better purification rates. The system described in U.S. Pat. No. 8,673,129 does not create a serpentine flow pattern, exacerbating the need for recirculation, injection of air, or other methods to improve purification results. The system described in U.S. Pat. No. 8,858,790 B2 is similarly too large and heavy to be transported between sites, making its utility rather limited. The system described in U.S. Pat. No. 8,902,637 relies on many stages prior to and beyond electrocoagulation, which may be equipment, time, or labor intensive in achieving desired purification.

Perhaps one of the most significant problems that well operators have faced is the equipment bulk and capital investment required for what will very often be a temporary operating site. While the typical fracking well may have an operational lifespan of anywhere from 20-40 years, the ongoing controversies surrounding the practice make that lifespan highly uncertain. Dependent on the state or other jurisdictions empowered to regulate the practice, operators of such wells must constantly be wary of the possibility of regulations, restrictions, moratoria, or outright bans on the practice. Even without this risk, it is of course always desirable to invest less capital so long as the same level of quality and safety results can be achieved. The proper cleaning and repurposing of fracking fluid typically relies on huge pieces of equipment that may be assembled on-site, may be installed for the operational life of the well, and may require full dismantling to be removed when a well closes, for whatever reason. To that end, a system that can be transported between well sites without any disassembly or reassembly, perhaps accruing substantial cost savings in both capital and labor, is desirable.

A second problem faced by operators of such wells is the substantial difficulty in achieving desired levels of purification. Typical systems can succeed in removing about 80% of particulates, suspended solids, and other pollutants from fracking effluent as it is run through those systems. Obviously, a higher degree of purification may be desired. Typical systems may ignore this desire and accept suboptimal purification; they may also install additional systems which can put the effluent through additional processes. The main issue with all of these approaches is that they lack integration, building in additional costs in both labor and capital. A secondary issue is that additional transfer steps always run the risk of spillage of the still-contaminated effluent. Therefore, a single, fully integrated system which can accomplish desired levels of purification without the transfer of effluent between different systems is desirable.

In addition to the specific issues described above, a wide variety of other problems exist in the field as it stands. These include, but are not limited to, cost of materials, cost of labor, repairs, purification time, and environmental degradation, among others.

SUMMARY OF THE INVENTION

The present invention overcomes the problems of prior systems and can incorporate elements such as: an influent intake line 100, perhaps 2" in diameter, perhaps connected to an air hopper 102 which may interstitially inject air into said influent intake line 100. The influent intake line 100 may connect to an influent intake feed 104 on an influent side of a small, portable plastic housing 106. This housing may contain one or more anodic 108 and cathodic 110 voltaic inspissation plates 112, and the influent may be directed through such plates 112 in a meandering, or perhaps even a serpentine fashion. The entire system may be charged or powered by an electrical power source such as a variable electric current or voltage as the influent passes through, perhaps at 5 volts. The process can result in the coagulation or inspissation of solids and other undesired particles, which may then be discharged through one or more effluent ports 114, perhaps three, and perhaps 2" in diameter. The fluid may then pass directly into a recirculation line 116, which may then immediately direct the fluid back into an influent intake line 100, perhaps for another pass through the system. The system may incorporate a valve 118 to direct effluent after passage through the housing. In addition to being recirculated, the system may also direct effluent to an external gas diffuser 120, perhaps accomplishing one direction or the other by use of such a valve 118. Such a diffuser 120 may separate and redirect gases from the effluent, perhaps sending them to a different part of the system for exit or disposal. The effluent may then be directed into a variety of additional places, perhaps for additional processing, perhaps done by a decanter 122 or a centrifuge 124 or by filtration or by natural settling, or it may be transported into a final disposal vessel 126 if processing is complete.

In general, the invention can involve both devices and process steps for fluid purification, whether fracking or other fluid, and perhaps even for use in simple water cleansing. The invention can relate to a portable, relatively small system, perhaps ranging from 1'×1'×1' all the way up to 6'×6'×6 or any dimensions in between, that may be employed to low-cost and multiple-well purification substantially without disassembly or reassembly. Various degrees of retention time and a variety of purification steps may be accomplished individually or collectively based on the choice of the site operator, perhaps substantially without the need for equipment alterations to achieve the desired steps. Systems may target 80% purification, 99.9% purification, or any degree within that range.

As can be appreciated from the above, the present invention disclosure includes a variety of aspects which may be selected in different combinations based upon the particular application or needs to be addressed. In a basic form, the invention can use a "box" configuration that may fit into a typical truck bed, with an influent intake line 100, perhaps ranging from 0.5" to 4" in diameter, perhaps at 2", perhaps connected to an air hopper 102 which may interstitially inject air into said influent intake line 100. Said box may contain any number of voltaic inspissation plates 112 which may be spaced at intervals throughout the box 106. The effluent may be variably charged by an electric current as it passes through such plates 112, which may serve by their placement or otherwise to direct effluent flow in a meandering or even serpentine fashion through a box, and may serve as either anodic 108 or cathodic 110 voltaic inspissation plates as charge is varied, perhaps in the range of 1 to 12 volts, perhaps at 5 volts. As the charge varies and the fluid moves through the system, voltaic inspissation of solids and other particulates may occur. Such voltaic inspissation plates 112 may perhaps be freely interchangeable with additional voltaic inspissation plates 112, and may be solids voltaic inspissation plates 128 or diamond mesh voltaic inspissation plates 130. Such material, as well as the fluid itself, may ultimately exit the box through one or more effluent ports 114, perhaps three, and perhaps 2" in diameter. Such a box may, in its entirety, be relatively small, made of plastic or other material, and may be portable, perhaps even transportable via a typical truck bed.

Such a box 106 may have at least one valve 118, which may be operated manually, remotely, or even automatically, and may serve to direct the fluid to any one of multiple destinations upon exit from the box 106. A valve 118 may direct solids or other particles to a disposer, while it may direct fluid to a recirculation line 116, perhaps for reinsertion into an influent intake line 100 and an additional pass through a box 106. In this fashion, fluid can theoretically be routed through the box as many times as desired. A valve 118 may also serve, when desired, to instead direct fluid into a gas diffuser 120 external to a box 106. Such a gas diffuser 120 may serve to separate gases from the fluid, and it may then separately route said gases to a disposer 126 while routing the fluid to additional processing steps (such as a decanter 122, a centrifuge 124, or others) or even to final disposal depending on a well operator's desires. Because hydrogen gas may actually be desirable, perhaps to power the electrocoagulation system or other systems, a gas diffuser 120 may assist in capturing hydrogen gas for use in this or other applications.

On an influent side of such a box 106, there may be an air hopper 102 which may interstitially inject air into an influent intake line 100 prior to said influent's passage into a box 106.

A general object of the invention is to provide a portable purification system that can be utilized at multiple wells substantially without the need for assembly or disassembly. In keeping with this goal, it is an object to provide a system that can be transported between wells without undue expense of labor, such as via a standard passenger truck.

Another goal is to provide a purification system where multiple types of purification can be used in combination, in tandem, or individually depending on a well operator's needs, substantially without the need for undue reconfiguration of the system. In keeping with this goal, it is an object to provide a system where multiple varieties of voltaic inspissation plates can be interchanged in the standard box unit without undue labor. It is also an object to allow for various additional steps in addition to voltaic inspissation to be performed or left out as desired.

Yet another goal of embodiments of the invention can be to provide the possibility of either prolonged purification retention times or expedited retention times, perhaps by the use of a recirculation line, perhaps controlled by a valve.

The present invention can allow for purification at multiple sites substantially without assembly or disassembly as the box unit is transported from site to site, perhaps in a standard passenger truck. The present invention can allow for varied degrees of purification in various methods and by various configurations, all substantially without the need for disassembly and reassembly, and all configurable according to a site operator's individual needs.

One of the broad objects of embodiments of the invention may be to allow for transport between sites, perhaps in a standard passenger truck, and perhaps substantially without need for disassembly and reassembly. Thus, a goal can be to provide a small, portable system nonetheless capable of achieving desired purification. To achieve this, a box may be built of any of a variety of plastics, perhaps in a 2'×2×4' configuration. Such a box can weigh less than 1000 pounds, making it possible to transport it in a standard passenger truck and movable with relatively little effort. In keeping with the identified object, such a box may contain substantially all that is needed to accomplish purification objectives, perhaps only requiring that the fluid and a final disposer be connected to the box.

Another broad object of embodiments of the invention may be to provide a variety of purification options, both by variable options for type of purification and the ability to vary retention times as desired. Accordingly, the invention may feature a recirculation line 116 which may retain the fluid inside the system for as long as a site operator may wish it to achieve purification goals. The invention may also feature interchangeable voltaic inspissation plates 112, perhaps solids voltaic inspissation plates 128 or diamond mesh inspissation plates 130, which may serve to increase or decrease flow rate as desired. The invention may feature an air hopper 102 which may interstitially inject air into the influent intake line 100 to assist in purification goals. After passage through the box, fluid may be directed to any, all, or none of a gas diffuser 120, a decanter 122, a centrifuge 124, filtration, or final disposal 126, perhaps all configurable according to an individual site operator's needs, perhaps determined by government regulation parameters, or purification level parameters, or simply user desires.

Still another broad object of embodiments of the invention can simply be to accomplish improved removal percentages for solids, other particles, gases, and other undesirable materials. Thus, a goal of embodiments of the invention can be to allow a variety of both purification steps and purification times. Simple quality in use of materials, such as voltaic inspissation plates or any of a variety of plastics, can assist in accomplishing better purification quantities. Where typical systems are capable of removing perhaps 80% of undesired materials, embodiments of the present invention may allow for removal of 99% or even more of such material depending on the embodiment selected by an individual site operator.

The following descriptions and referenced drawings are for selected embodiments of the present invention. Naturally, changes may be made to the disclosed embodiments while still falling within the scope and spirit of the present invention and the patent granted to its inventors.

DETAILED DESCRIPTION OF THE PREFERRED EMBODIMENTS

As can be seen from the figures, the basic components of the present invention may be embodied in several different ways. The present invention includes a variety of aspects, which may be combined in different ways. The following descriptions are provided to list elements and describe some of the embodiments of the present invention. These elements are listed with initial embodiments, however it should be understood that they may be combined and varied in any manner and in any number to create additional embodiments. The variously described examples and preferred embodiments should not be construed to limit the present invention to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

The following explains aspects of embodiments. It should be understood that these are examples of types of systems and configurations that can be used to achieve the broad aspects of the invention, and are not to be considered limiting as they are only examples of the many embodiments possible.

Figure 1:
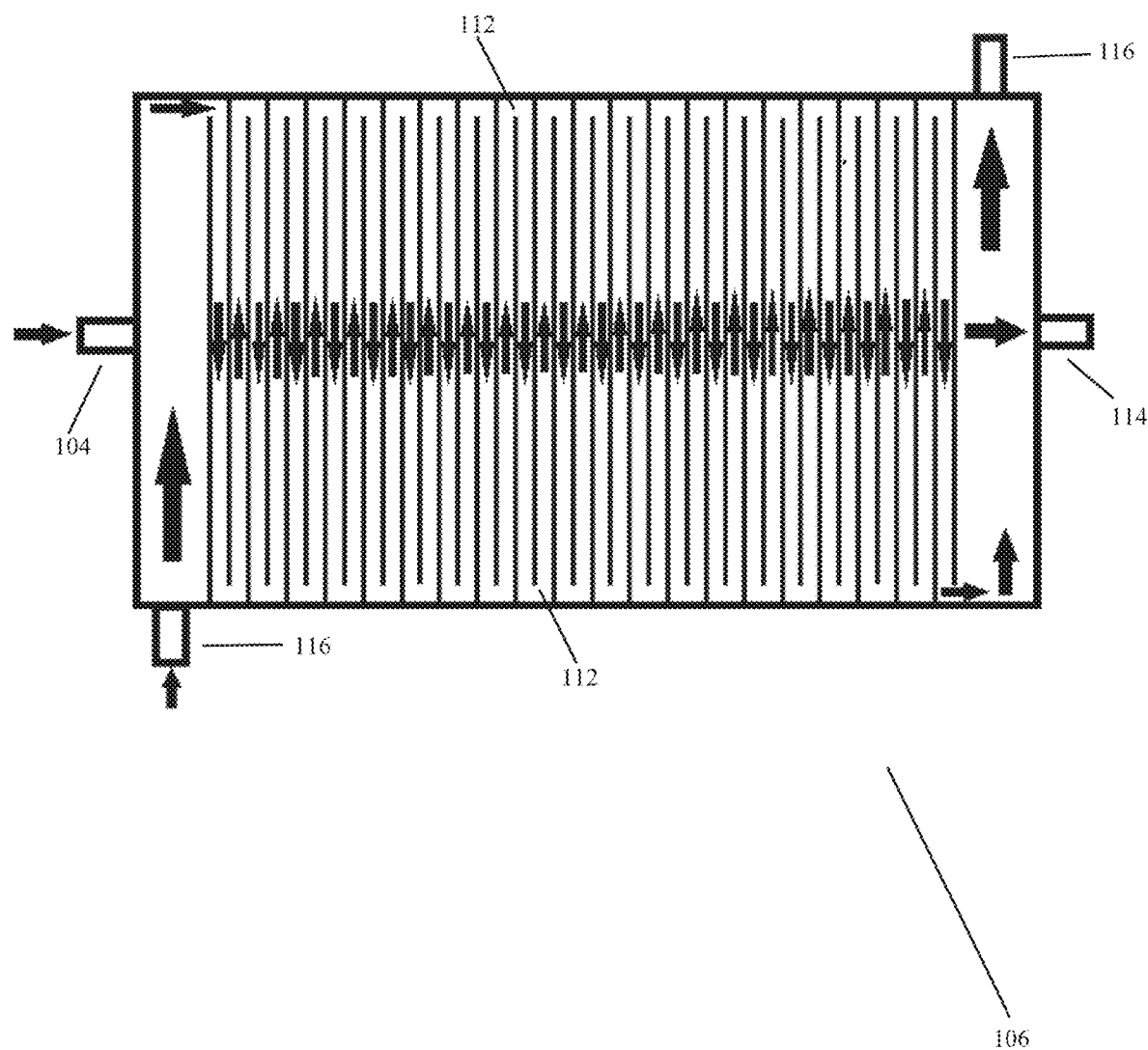
FIG. 1 is a top view of the fluid path through an embodiment of the invention.

FIG. 1 demonstrates the fluid path through an embodiment of the invention. Fluid may be transported from a source (not shown) through an intake feed 104 into a small, portable plastic housing 106. This housing may contain any number of voltaic inspissation plates 112, perhaps serving as a discrete segmentation wall or walls, perhaps arranged in a manner to encourage meandering or serpentine fluid flow through that housing 106. After passage through a housing 106, fluid may be directed through a recirculation line 116. Such a recirculation line may bring the fluid back to a proximal end of a housing 106 for any number of repeat trips through such a housing 106. At any time, fluid may also be directed through an effluent port 114, perhaps for additional processing or perhaps for final disposal.

Figure 2:
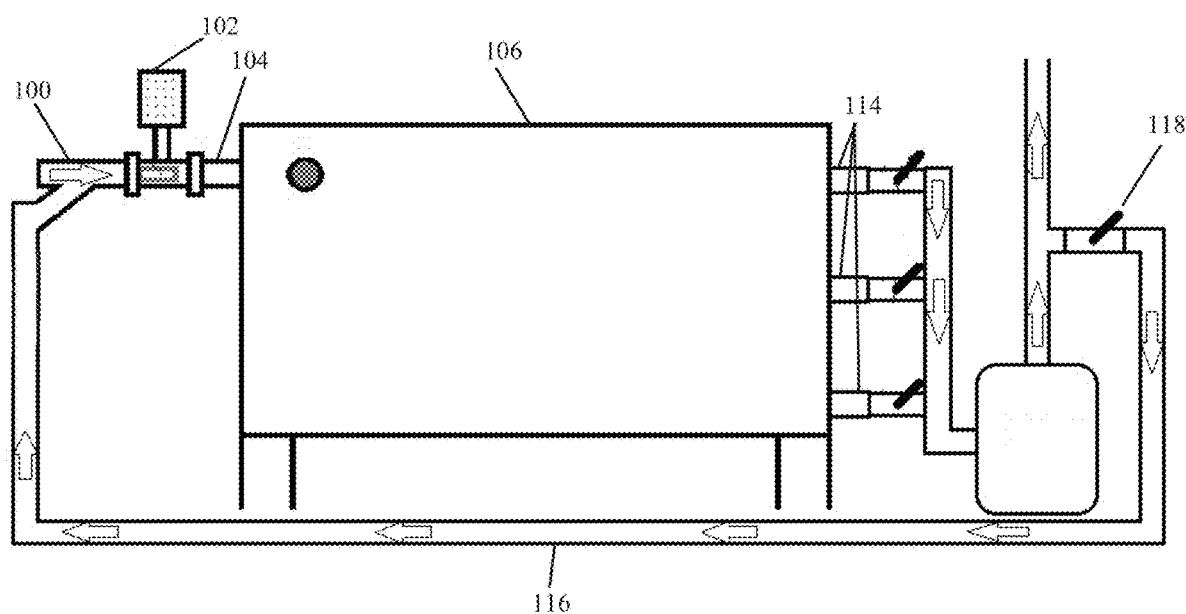
FIG. 2 is a side view of an embodiment of the invention.

FIG. 2 demonstrates an embodiment of the invention. Embodiments may feature an intake line 100 that may serve to transport fluid from a source to an intake feed 104. Embodiments may include an air hopper 102 which may assist purification efforts by interstitially injecting air into the fluid sought to be purified. After passage through a housing 106, fluid may exit through one of more effluent ports 114, to an effluent junction, where it may be directed by a flow direction control, perhaps a valve 118, into a recirculation line 116. A recirculation line 116 may transport fluid back into a housing 106 for one or more additional rounds of processing. Alternatively, a valve 118, perhaps user-controlled, may direct fluid away from a housing 106, perhaps for additional types of processing or perhaps for final disposal.

Figure 3:
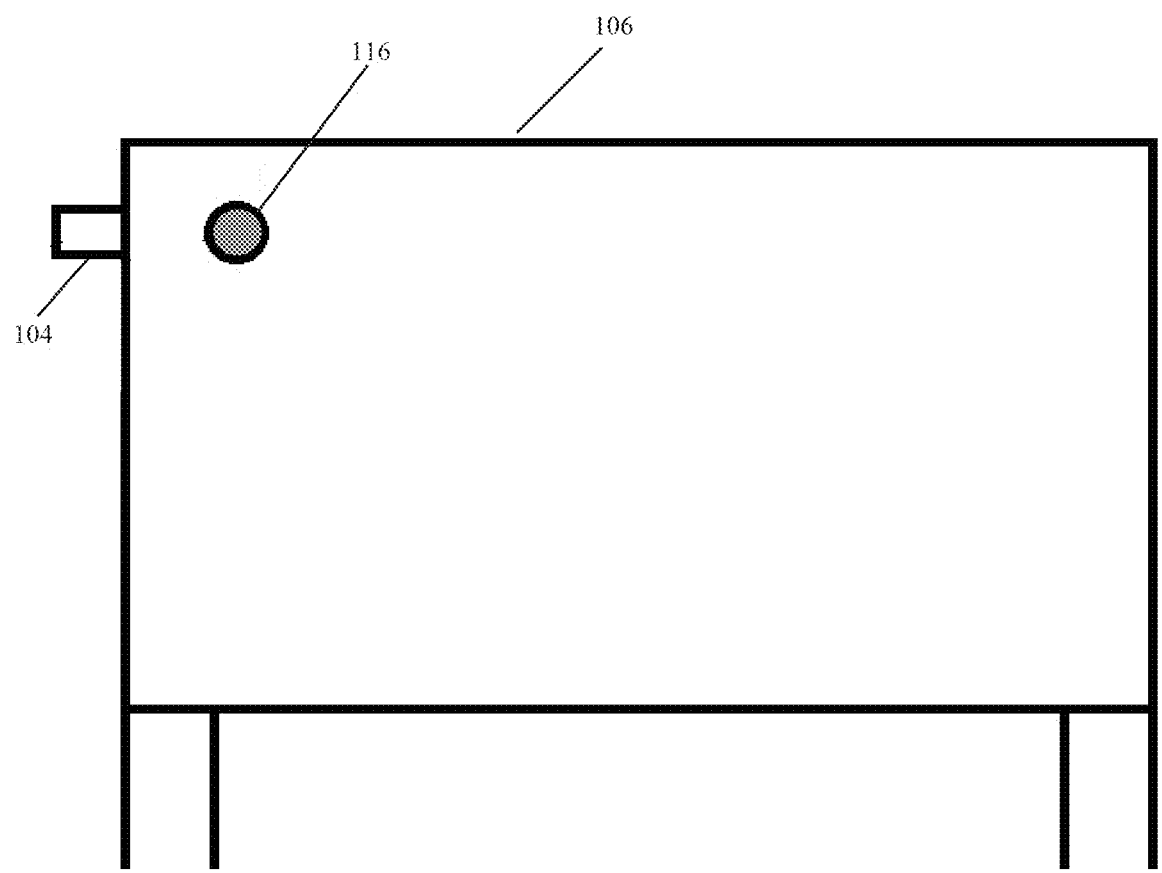
FIG. 3 is a side view of an embodiment of the invention.

FIG. 3 demonstrates an embodiment of the invention. As shown with greater detail in FIG. 2, embodiments may transport fluid into a housing 106 by either or both of an intake feed 104 and a recirculation line 116. Fluid can thus pass through a housing 106 any desired number of times until a desired level of purification is reached, at which point a recirculation line 116, perhaps an interruptable recirculation line, may be closed. Embodiments of the invention may include an automatic phase-state sensitive recirculation line, perhaps incorporating a sensor and a recirculation line controller to achieve a desired degree of automation.

Figure 4:
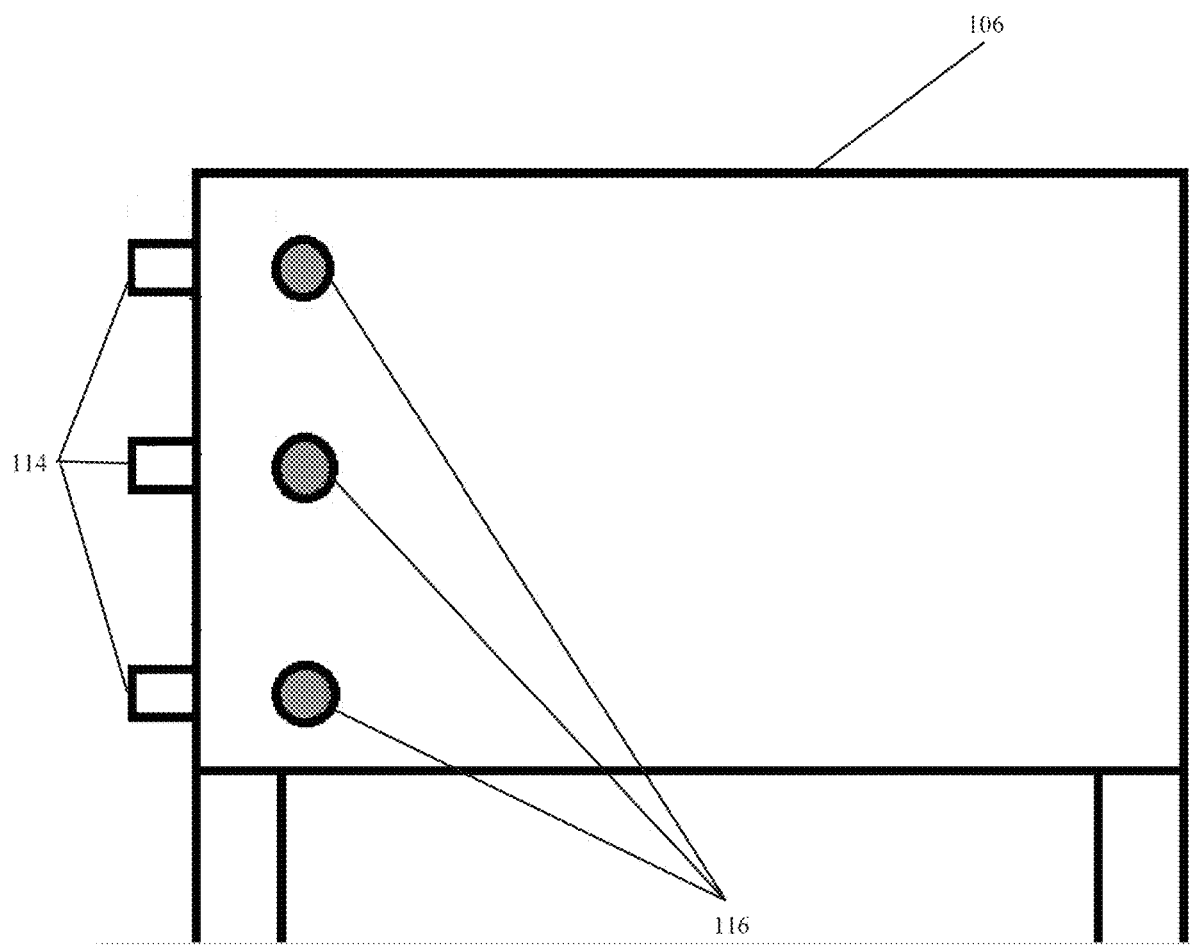
FIG. 4 is a side view of an embodiment of the invention.

FIG. 4 demonstrates an embodiment of the invention. As shown with greater detail in FIG. 2, embodiments may provide for fluid exit by one or more recirculation lines 116 or one or more effluent ports 104, perhaps three. These ports may provide a modular attachment point for a recirculation line 116, and may be positioned in the upper third, the middle third, or the lower third of a housing 106. Fluid can thus pass through a housing 106 any desired number of times before transport away, perhaps for additional types of processing or perhaps for final disposal. In certain embodiments, since a recirculation line 116 may be positioned at a variable height on a housing 106, a recirculation line may serve as a housing fluid volume control, perhaps either increasing or decreasing the volume of fluid being circulated in the system. In certain embodiments, the system may be disconnected from both an intake feed 104 and final disposal 126, allowing fluid to recirculate indefinitely. In such embodiments, if any charge is also removed, a recirculation line 116 may function as a steady state cleaning line. In such embodiments, a steady state cleaning line can run as long as needed to serve as a voltaic inspissation plate cleaning line.

Figure 5:
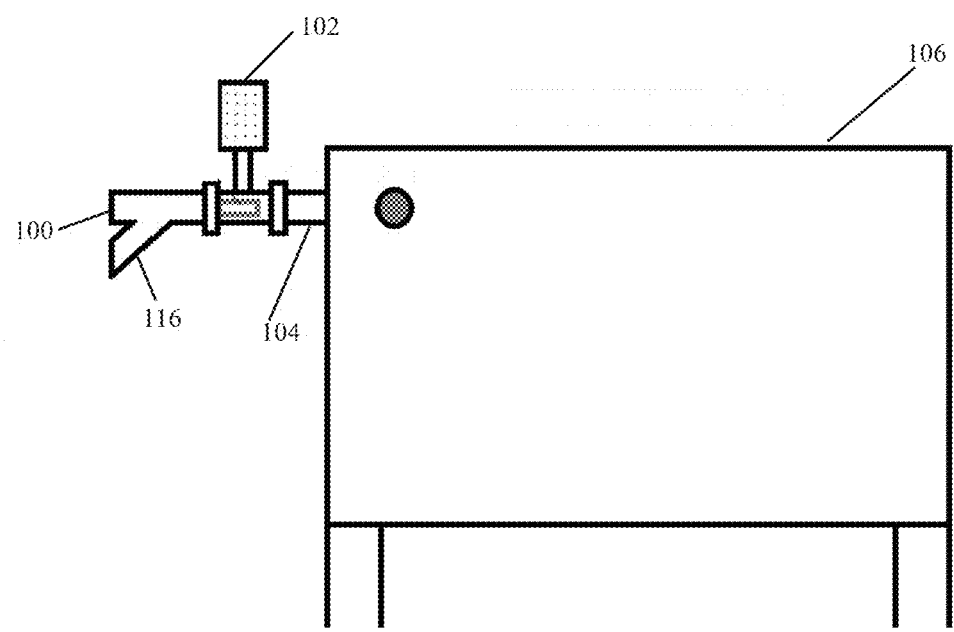
FIG. 5 is side view of an embodiment of the invention.

FIG. 5 demonstrates an embodiment of the invention. In certain embodiments, an air hopper 102 may inject air into a fluid sample in an intake line 100 before it reaches an intake feed 104 and a small, portable plastic housing 106. In such embodiments, an air hopper 102 may serve as a fluid aerator. In embodiments, an air hopper 102 may be modular, and may be installed at any point in an ongoing process. It may be installed prior to or after voltaic inspissation. In embodiments featuring a post-voltaic inspissation air hopper, it may be installed either ahead of or behind a recirculation line 116. In embodiments where a recirculation line 116 is present, that line may reintroduce fluid into an intake line 100 prior to an interstitial air injection site. It may also reintroduce fluid directly into a housing 106 depending on how an individual user wishes to configure the embodiment.

Figure 6B:
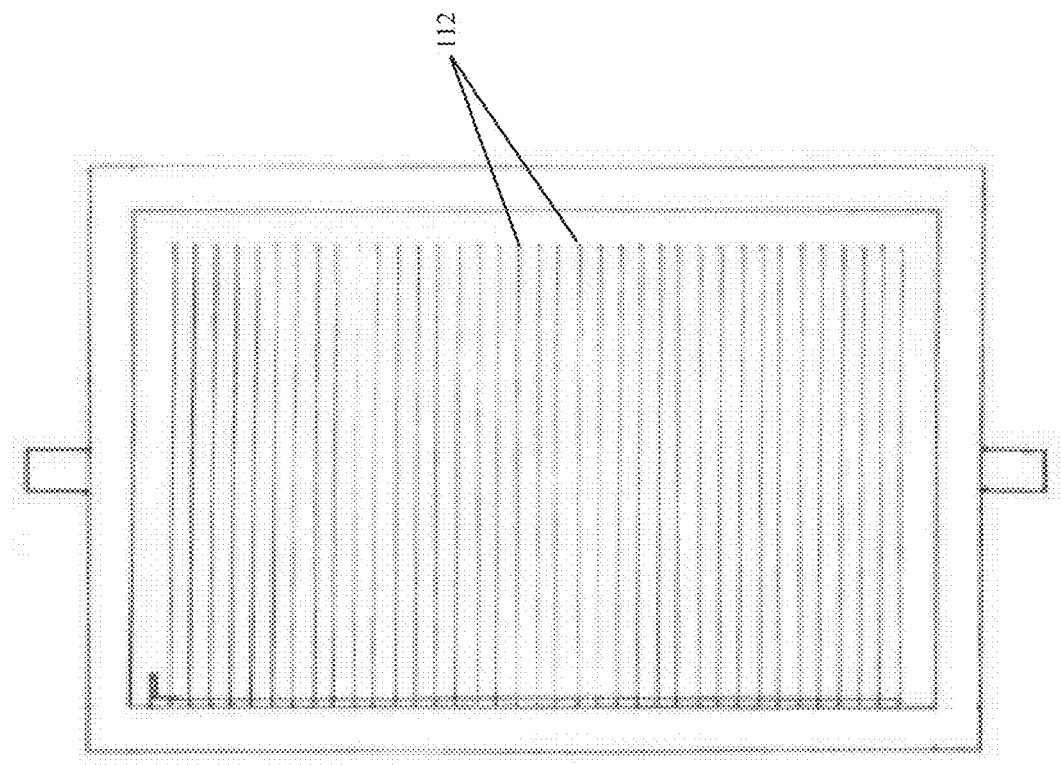
FIG. 6B is a side view of a voltaic inspissation plate.
Figure 6A:
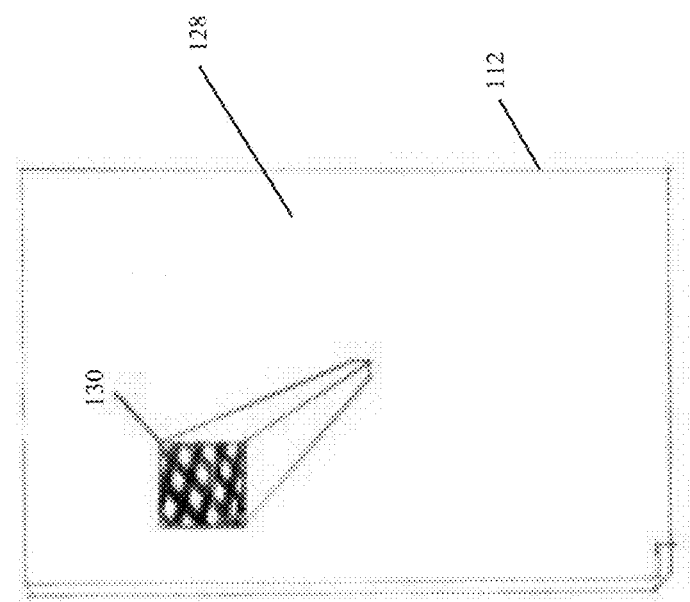
FIG. 6A is a side view of a voltaic inspissation plate.

FIG. 6A demonstrates possibilities for a voltaic inspissation plate 112. Such a plate may be a solids voltaic inspissation plate 128 or a diamond mesh voltaic inspissation plate 130. When either variety of voltaic inspissation plate 112 is desired for use in a housing 106, they may be inserted into such a housing 106 in any desired configuration and may also be freely interchangeable, perhaps detachable by a user, depending on the configuration desired. FIG. 6B shows voltaic inspissation plates 112 as they may appear inside a small, portable plastic housing 106, and also shows how they may be freely interchangeable simply by removing a lid from such a housing 106.

Figure 7:
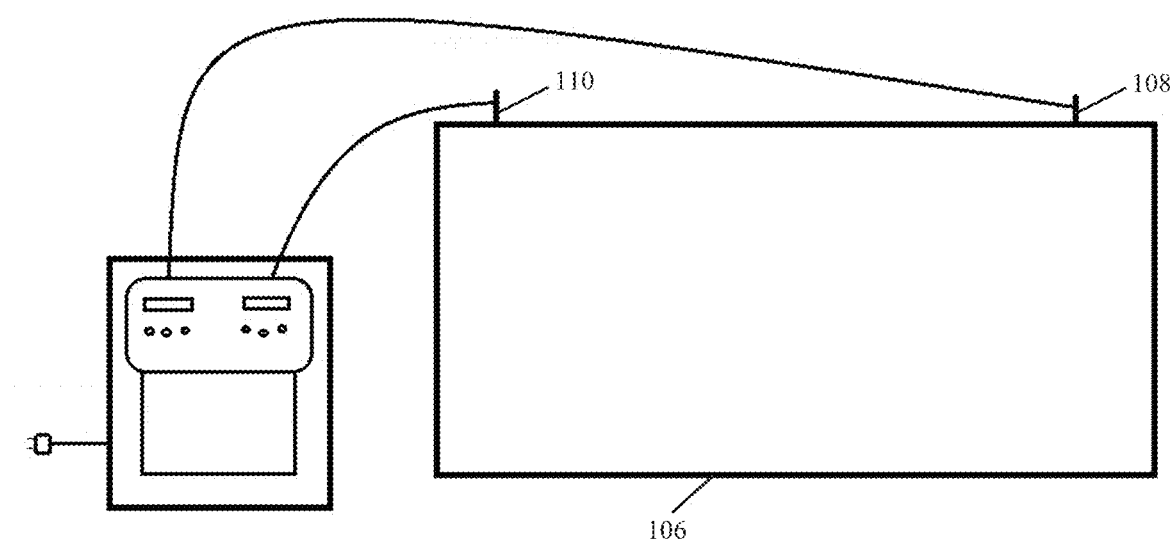
FIG. 7 is a side view of an embodiment of the invention.

FIG. 7 demonstrates an embodiment of the invention with a portable electrocoagulation voltage supply. Either end of a housing may feature an anode 108 and a cathode 110, which may serve to establish a current within a small, portable plastic housing 106 equipped with any number of voltaic inspissation plates 112. As fluid moves through such a housing 106, a current interacts with voltaic inspissation plates 112 to create voltaic inspissation. This voltaic inspissation may serve to purify the fluid, especially in embodiments that include a recirculation line 116 for multiple passes through such a housing 106.

Figure 8:
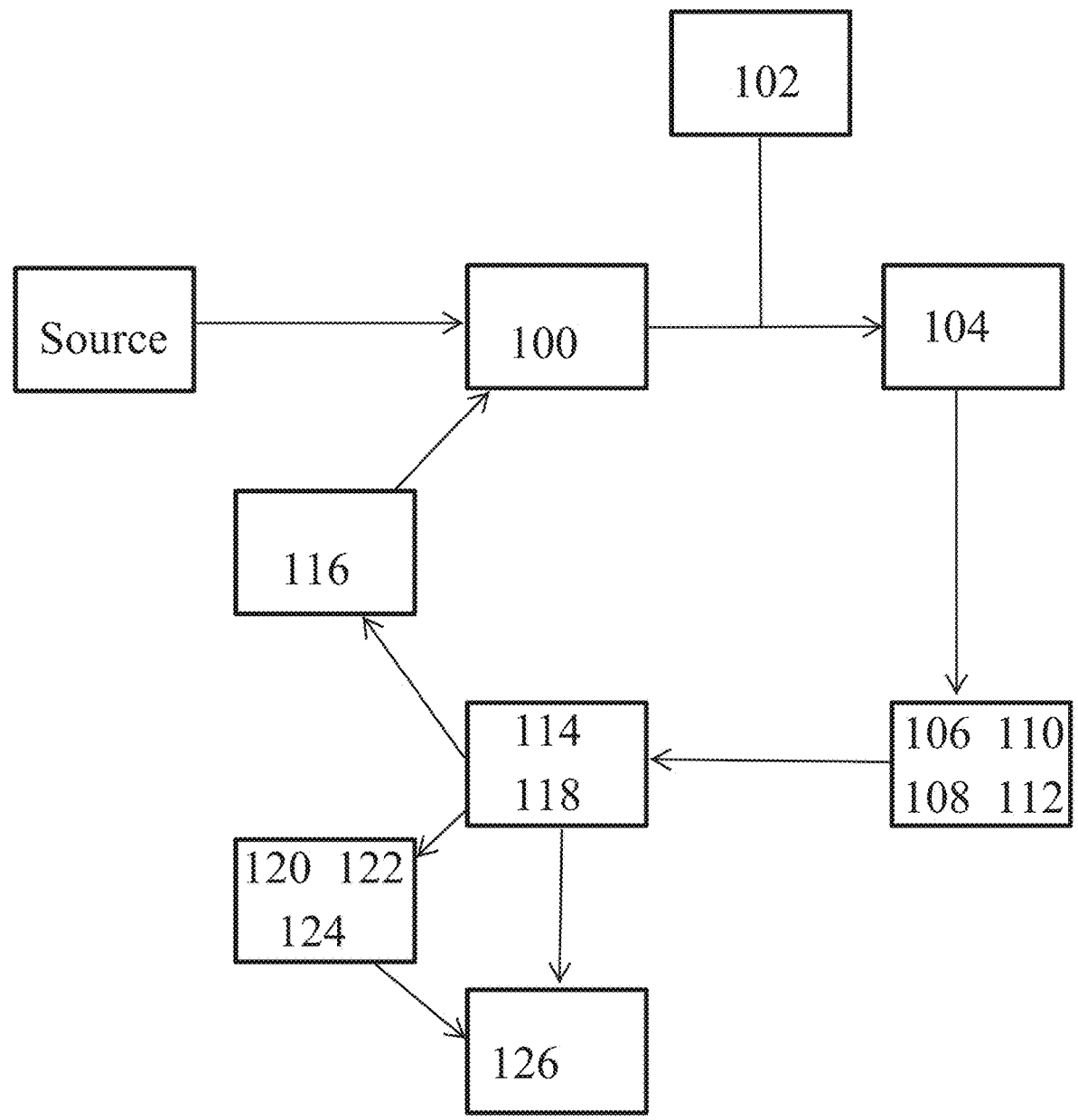
FIG. 8 is a block diagram of a process embodiment of the invention.

FIG. 8 is a block diagram demonstrating possible purification steps fluid may pass through. Fluid may initially be transported from a source by an intake line 100. This intake line 100 may transport fluid to an intake feed 104. Embodiments may include an air hopper 102 which may interstitially inject air into the fluid before its arrival at an intake feed 104. An intake feed 104 may then transport fluid into a small, portable plastic housing 106. Such a housing 106 may include an anode 108 and a cathode 110, accommodating a current. Such a housing 106 may also include one or more voltaic inspissation plates 112, which may interact with both fluid and a power, current, or voltage to cause fluid purification by way of voltaic inspissation. After passage through a housing 106, fluid may exit the housing via an effluent port 114 before arriving at a valve 118. A valve 118 may direct fluid into a recirculation line 116, which may direct the fluid back to an intake line 100 for one or more additional rounds of processing. A valve 118 may also direct fluid into additional processing steps, perhaps including a gas diffuser 120, a decanter 122, or a centrifuge 124. In certain embodiments, a modular external gas diffuser 120 may serve as a hydrogen partial pressure control. Controlling partial pressure may, in turn, allow a gas diffuser 120 to serve as a pH control, perhaps by functioning as an alkalizer, or such may be otherwise controlled as is well understood. In addition to embodiments where a gas diffuser 120 is installed behind (or after) a recirculation line, a modular external gas diffuser 120 may also be installed ahead of (or before) a recirculation line in certain embodiments, allowing gas diffusion to occur at any point in the process. With or without such additional processing, fluid may ultimately be directed out to final disposal 126 once the desired level of purification has been attained.

As should be appreciated, the various aspects of the embodiments described may be combined in different ways. Again, it is intended that the broad scope of this patent encompass all various permutations and combinations since each may be dependent on or selected for particular applications involved. The foregoing discussion describes the preferred embodiments of the present invention. It should be understood that changes may be made without departing from the essence of the invention. In this regard, it is intended that such changes would still fall within the scope of the patent. It simply is not practical to describe all possible revisions to the present invention which may be accomplished. To the extent any revision utilizes the essence of any one of the features of the present invention, it would naturally fall within the breadth of protection encompassed by this patent. Any changes or modifications made without departing from the broad aspects of the present invention are intended to be encompassed by this patent.

Again, different features were discussed for various fluid purification systems. The features of each of the fluid purification systems are not to be considered as applicable to only one fluid purification system but should be considered as useful for all of the presented fluid purification systems. Any of the mentioned purification devices are examples and could change without distracting from the purpose of the purification devices. While the invention has been described in connection with a preferred embodiment, it is not intended to limit the scope of the invention to the particular form set forth, but on the contrary, it is intended to cover such alternatives, modifications, and equivalents as may be included within the spirit and scope of the invention.

As can be easily understood from the foregoing, the basic concepts of the present invention may be embodied in a variety of ways. It involves both purification techniques as well as devices to accomplish the appropriate purification. In this application, the purification techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims that are or will be included in this or any subsequent patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting the claims for this or any subsequent patent application. It should be understood that such language changes and broader or more detailed claiming may be accomplished at a later date (such as by any required deadline) or in the event the applicant subsequently seeks an additional patent filing(s) based on this filing. With this understanding, the reader should be aware that this disclosure is to be understood to support this or any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "purifier" should be understood to encompass disclosure of the act of "purifying"—whether explicitly discussed or not—and, conversely, were there effectively disclosure of the act of "purifying", such a disclosure should be understood to encompass disclosure of a "purifier" and even a "means for purifying." Such changes and alternative terms are to be understood to be explicitly included in the description. Further, each such means (whether explicitly so described or not) should be understood as encompassing all elements that can perform the given function, and all descriptions of elements that perform a described function should be understood as a non-limiting example of means for performing that function.

Any patents, publications, or other references mentioned in this application for patent are hereby incorporated by reference and can be relied upon as naming or depicting or disclosing elements that may be applicable to the present invention in its varied embodiments. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed below or other information statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

Thus, the applicant(s) should be understood to have support to claim and make a statement of invention to at least: i) each of the sampling systems and devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) an apparatus for performing the methods described herein comprising means for performing the steps, xii) the various combinations and permutations of each of the elements disclosed, xiii) each potentially dependent claim or concept as a dependency on each and every one of the independent claims or concepts presented, and xiv) all inventions described herein.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in *Hakim v. Cannon Avent Group, PLC,* 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising," are intended to imply the inclusion of a stated element or step or group of elements or steps but not the exclusion of any other element or step or group of elements or steps. Such terms should be interpreted in their most expansive form so as to afford the applicant the broadest coverage legally permissible.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Previously presented claims, now presented as clauses, included:

1. A fluid purification system comprising:
   an influent intake feed;
   an air hopper;
   a recirculation line;
   an interstitial air injector;
   a small portable plastic housing;
   at least one voltaic inspissation plate;
   an effluent outlet;
   an air and effluent confluence;
   an external gas diffuser;
   at least one discrete segmentation wall within said small portable plastic housing;
   a meandering flow director;
   a decanter;
   a centrifuge feed; and
   a centrifuge.

2. A method of purifying fluids comprising the steps of:
   inflowing fluid to a purification housing;
   providing air in a hopper;
   interstitially injecting said air into said fluid;
   dividing said housing into small, discrete sections;
   voltaically inspissating said fluid with at least one plate;
   pumping said fluid through said small, discrete sections in a meandering manner;
   outflowing said fluid;
   recirculating said fluid back to an entrance of said purification housing;
   diffusing gas from said fluid;
   decanting said fluid; and
   centrifuging said fluid.

3. An electrocoagulative fluid purification system comprising:
   an influent intake feed;
   a recirculation line;
   a recirculation intake port;
   a recirculation reentry port;
   a housing;
   at least one voltaic inspissation plate; and
   an effluent outlet.

4. An electrocoagulative fluid purification system as in clause 3, wherein said housing comprises a small, portable, plastic housing and further comprising a portable electrocoagulation voltage supply.

5. An electrocoagulative fluid purification system as in clause 3, further comprising at least one discrete segmentation wall within said housing.

6. An electrocoagulative fluid purification system as in clause 5, wherein said at least one discrete segmentation wall comprises a meandering flow director.

7. An electrocoagulative fluid purification system as in clause 3, wherein said at least one voltaic inspissation plate comprises an interchangeable voltaic inspissation plate and further comprising a user detachable attachment.

8. An electrocoagulative fluid purification system as in clause 3, wherein said at least one voltaic inspissation plate is selected from the group consisting of: solids plate and diamond mesh plate.

9. An electrocoagulative fluid purification system as in clause 3, further comprising an effluent junction and a flow direction control at said effluent junction.

10. An electrocoagulative fluid purification system as in clause 9, wherein said flow direction control comprises a valve.

11. An electrocoagulative fluid purification system as in clause 10, wherein said valve comprises a user-controlled valve.

12. An electrocoagulative fluid purification system as in clause 9, wherein said valve is responsive to at least one parameter selected from the group consisting of: government regulation parameters; purification level parameters; and user desires.

13. An electrocoagulative fluid purification system as in clause 3, wherein said recirculation line comprises an interruptable recirculation line.

14. An electrocoagulative fluid purification system as in clause 13, wherein said interruptable recirculation line comprises an automatic phase state sensitive recirculation line, and further comprising a sensor and a recirculation line controller.

15. An electrocoagulative fluid purification system as in clause 3, wherein said recirculation line comprises a housing fluid volume control.

16. An electrocoagulative fluid purification system as in clause 3, wherein said recirculation line comprises a steady state cleaning line.

17. An electrocoagulative fluid purification system as in clause 16, wherein said steady state cleaning line comprises a voltaic inspissation plate cleaning line.

18. An electrocoagulative fluid purification system as in clause 3, wherein said recirculation intake port and said recirculation reentry port are located within the upper third of said housing.

19. An electrocoagulative fluid purification system as in clause 3, wherein said recirculation intake port and said recirculation reentry port are located within the middle third of said housing.

20. An electrocoagulative fluid purification system as in clause 3, wherein said recirculation intake port and said recirculation reentry port are located within the bottom third of said housing.

21. A method of electrocoagulatively purifying fluids comprising the steps of:
   inflowing fluid to a purification housing;
   voltaically inspissating said fluid with at least one plate;
   outflowing said fluid; and
   recirculating said fluid back to an entrance of said purification housing.

22. A method of electrocoagulatively purifying fluids as in clause 21, wherein said step of inflowing fluid to a purification housing comprises the step of inflowing fluid to a small, plastic, portable housing.

23. A method of electrocoagulatively purifying fluids as in clause 21, further comprising the step of flowing fluid through discrete segments within said purification housing.

24. A method of electrocoagulatively purifying fluids as in clause 23, wherein said step of flowing fluid through discrete segments within said purification housing comprises the step of meandering fluid through discrete segments within said purification housing.

25. A method of electrocoagulatively purifying fluids as in clause 21, further comprising the step of interchanging voltaic inspissation plates.

26. A method of electrocoagulatively purifying fluids as in clause 25, wherein said step of interchanging voltaic inspissation plates comprises the step of interchanging solids voltaic inspissation plates with diamond mesh voltaic inspissation plates.

27. A method of electrocoagulatively purifying fluids as in clause 21, further comprising the steps of:
flowing said fluid to an effluent junction; and
controlling flow direction at said effluent junction.

28. A method of electrocoagulatively purifying fluids as in clause 27, wherein said step of controlling flow direction comprises the step of valve controlling flow direction.

29. A method of electrocoagulatively purifying fluids as in clause 28, wherein said step of valve controlling flow direction comprises the step of user controlling flow direction.

30. A method of electrocoagulatively purifying fluids as in clause 29, wherein said step of user controlling flow direction comprises the step of responsively controlling flow direction relative to at least one parameter selected from the group consisting of: government regulation parameters; purification level parameters; and user desires.

31. A method of electrocoagulatively purifying fluids as in clause 21, wherein said step of recirculating said fluid back to an entrance of said purification housing comprises the step of interruptably recirculating said fluid.

32. A method of electrocoagulatively purifying fluids as in clause 31, wherein said step of interruptably recirculating said fluid comprises the step of phase state responsively recirculating said fluid.

33. A method of electrocoagulatively purifying fluids as in clause 21, further comprising the step of controlling fluid volume.

34. A method of electrocoagulatively purifying fluids as in clause 21, further comprising the step of steady state cleaning said housing.

35. A method of electrocoagulatively purifying fluids as in clause 34, further comprising the step of steady state cleaning at least one voltaic inspissation plate.

36. A method of electrocoagulatively purifying fluids as in clause 21, further comprising the steps of:
recirculation intaking said fluid; and
reintroducing said fluid to said purification housing.

37. A method of electrocoagulatively purifying fluids as in clause 36, wherein said steps of recirculation intaking said fluid and reintroducing said fluid to said purification housing comprise the step of recirculating into the top third of said purification housing.

38. A method of electrocoagulatively purifying fluids as in clause 36, wherein said steps of recirculation intaking said fluid and reintroducing said fluid to said purification housing comprise the step of recirculating into the middle third of said purification housing.

39. A method of electrocoagulatively purifying fluids as in clause 36, wherein said steps of recirculation intaking said fluid and reintroducing said fluid to said purification housing comprise the step of recirculating into the bottom third of said purification housing.

40. An electrocoagulative fluid purification system comprising:
an influent intake feed;
a housing;
at least one voltaic inspissation plate;
an effluent outlet; and
an external gas diffuser.

41. An electrocoagulative fluid purification system as in clause 40, wherein said housing comprises a small, plastic, portable housing.

42. An electrocoagulative fluid purification system as in clause 40, further comprising at least one discrete segmentation wall within said housing.

43. An electrocoagulative fluid purification system as in clause 42, wherein said at least one discrete segmentation wall comprises a meandering flow director.

44. An electrocoagulative fluid purification system as in clause 40, wherein said at least one voltaic inspissation plate comprises an interchangeable voltaic inspissation plate.

45. An electrocoagulative fluid purification system as in clause 44, wherein said interchangeable voltaic inspissation plate is selected from the group consisting of: solids plate and diamond mesh plate.

46. An electrocoagulative fluid purification system as in clause 40, wherein said external gas diffuser comprises a hydrogen partial pressure control.

47. An electrocoagulative fluid purification system as in clause 40, wherein said external gas diffuser comprises a pH control.

48. An electrocoagulative fluid purification system as in clause 47, wherein said pH control comprises an alkalizer.

49. An electrocoagulative fluid purification system as in clause 40, wherein said external gas diffuser comprises a modular gas diffuser.

50. An electrocoagulative fluid purification system as in clause 49, wherein said modular gas diffuser is installed ahead of said recirculation line.

51. An electrocoagulative fluid purification system as in clause 49, wherein said modular gas diffuser is installed behind said recirculation line.

52. An electrocoagulative fluid purification system as in clause 40, further comprising a hydrogen producer.

53. An electrocoagulative method of purifying fluids comprising the steps of:
inflowing fluid to a purification housing;
voltaically inspissating said fluid with at least one plate;
outflowing said fluid; and
diffusing gas from said fluid.

54. An electrocoagulative method of purifying fluids as in clause 53, wherein said step of inflowing fluid to a purification housing comprises the step of inflowing fluid to a small, plastic, portable housing.

55. An electrocoagulative method of purifying fluids as in clause 53, further comprising the step of flowing fluid through discrete segments within said purification housing.

56. An electrocoagulative method of purifying fluids as in clause 55, wherein said step of flowing fluid through discrete segments within said purification housing comprises the step of meandering fluid through discrete segments within said purification housing.

57. An electrocoagulative method of purifying fluids as in clause 53, further comprising the step of interchanging voltaic inspissation plates.

58. An electrocoagulative method of purifying fluids as in clause 57, wherein said step of interchanging voltaic inspissation plates comprises the step of interchanging solids voltaic inspissation plates with diamond mesh voltaic inspissation plates.

59. An electrocoagulative method of purifying fluids as in clause 53, wherein said step of diffusing gas from said fluid comprises the step of controlling hydrogen partial pressure.

60. An electrocoagulative method of purifying fluids as in clause 53, wherein said step of diffusing gas from said fluid comprises the step of controlling pH.

61. An electrocoagulative method of purifying fluids as in clause 60, wherein said step of controlling pH comprises the step of alkalizing said fluid.

62. An electrocoagulative method of purifying fluids as in clause 53, further comprising the step of installing a modular gas diffuser.

63. An electrocoagulative method of purifying fluids as in clause 62, wherein said step of installing a modular gas diffuser comprises the step of installing a modular gas diffuser ahead of a recirculation line.

64. An electrocoagulative method of purifying fluids as in clause 62, wherein said step of installing a modular gas diffuser comprises the step of installing a modular gas diffuser behind a recirculation line.

65. An electrocoagulative method of purifying fluids as in clause 53, further comprising the steps of producing and capturing hydrogen gas.

66. An electrocoagulative fluid purification system comprising:
    an influent intake feed;
    a housing;
    at least one voltaic inspissation plate;
    an effluent outlet; and
    an interstitial air injector.

67. An electrocoagulative fluid purification system as in clause 66, wherein said housing comprises a small, portable, plastic housing.

68. An electrocoagulative fluid purification system as in clause 66, further comprising at least one discrete segmentation wall within said housing.

69. An electrocoagulative fluid purification system as in clause 68, wherein said at least one discrete segmentation wall comprises a meandering flow director.

70. An electrocoagulative fluid purification system as in clause 66, wherein said at least one voltaic inspissation plate comprises an interchangeable coagulation plate.

71. An electrocoagulative fluid purification system as in clause 70, wherein said interchangeable voltaic inspissation plate is selected from the group consisting of: solids plate and diamond mesh plate.

72. An electrocoagulative fluid purification system as in clause 66, further comprising a fluid aerator.

73. An electrocoagulative fluid purification system as in clause 66, wherein said interstitial air injector comprises a pre-voltaic inspissation interstitial air injector.

74. An electrocoagulative fluid purification system as in clause 66, wherein said interstitial air injector comprises a post-voltaic inspissation interstitial air injector.

75. An electrocoagulative fluid purification system as in clause 74, wherein said post-voltaic inspissation interstitial air injector comprises a pre-recirculation interstitial air injector.

76. An electrocoagulative fluid purification system as in clause 74, wherein said post-voltaic inspissation interstitial air injector comprises a post-recirculation interstitial air injector.

77. An electrocoagulative method of purifying fluids comprising the steps of:
    inflowing fluid to a purification housing;
    providing air in a hopper;
    interstitially injecting said air into said fluid;
    voltaically inspissating said fluid with at least one plate; and
    outflowing said fluid.

78. An electrocoagulative method of purifying fluids as in clause 77, wherein said step of inflowing fluid to a purification housing comprises the step of inflowing fluid to a small, plastic, portable housing.

79. An electrocoagulative method of purifying fluids as in clause 77, further comprising the step of flowing fluid through discrete segments within said purification housing.

80. An electrocoagulative method of purifying fluids as in clause 79, wherein said step of flowing fluid through discrete segments within said purification housing comprises the step of meandering fluid through discrete segments within said purification housing.

81. An electrocoagulative method of purifying fluids as in clause 77, further comprising the step of interchanging voltaic inspissation plates.

82. An electrocoagulative method of purifying fluids as in clause 81, wherein said step of interchanging voltaic inspissation plates comprises the step of interchanging solids voltaic inspissation plates with diamond mesh voltaic inspissation plates.

83. An electrocoagulative method of purifying fluids as in clause 77, further comprising the step of aerating said fluid.

84. An electrocoagulative method of purifying fluids as in clause 77, wherein said step of interstitially injecting air into said fluid comprises the step of interstitially injecting air into said fluid prior to said step of voltaically inspissating said fluid with at least one plate.

85. An electrocoagulative method of purifying fluids as in clause 77, wherein said step of interstitially injecting air into said fluid comprises the step of interstitially injecting air into said fluid after said step of voltaically inspissating said fluid with at least one plate.

86. An electrocoagulative method of purifying fluids as in clause 85, further comprising the step of recirculating said fluid, wherein said step of interstitially injecting air into said fluid after said step of voltaically inspissating said fluid with at least one plate comprises the step of interstitially injecting air into said fluid after said step of voltaically inspissating said fluid with at least one plate and prior to said step of recirculating said fluid.

87. An electrocoagulative method of purifying fluids as in clause 85, further comprising the step of recirculating said fluid, wherein said step of interstitially injecting air into said fluid after said step of voltaically inspissating said fluid with at least one plate comprises the step of interstitially injecting air into said fluid after said step of voltaically inspissating said fluid with at least one plate and after said step of recirculating said fluid.

What is claimed is:

1. A petroleum byproduct fluid purification system comprising:
   a petroleum byproduct influent intake feed;
   a recirculation line;
   a small portable housing;
   at least one voltaic inspissation plate contained with said small portable housing;
   a petroleum byproduct effluent outlet;
   at least one discrete segmentation wall within said small portable housing;
   a meandering flow director configured to direct flow of said petroleum byproduct to alternate between anodic and cathodic voltage inspissation plates in a serpentine fashion as said petroleum byproduct fluid is contained to pass through said small portable housing;
   a decanter;
   a centrifuge feed;
   a centrifuge; and
   a pH control.

2. A petroleum byproduct fluid purification system as in claim 1, wherein said small portable housing comprises a small, portable, plastic housing and further comprising a portable electrocoagulation voltage supply.

3. A petroleum byproduct fluid purification system as in claim 1, wherein said at least one voltaic inspissation plate is selected from the group consisting of:
   solids plate and diamond mesh plate.

4. A petroleum byproduct fluid purification system as in claim 1, wherein said recirculation line comprises a housing fluid volume control.

5. A petroleum byproduct fluid purification system as in claim 1, wherein said recirculation line comprises a steady state cleaning line.

6. A petroleum byproduct fluid purification system as in claim 1, and further comprising an external gas hydrogen partial pressure control.

7. A petroleum byproduct fluid purification system as in claim 1, wherein said pH control comprises an alkalizer.

8. An electrocoagulative petroleum byproduct fluid purification system as in claim 1, and further comprising a recirculation line.

9. An electrocoagulative petroleum byproduct fluid purification system as in claim 8, wherein said recirculation line comprises a housing fluid volume control.

10. An electrocoagulative petroleum byproduct fluid purification system as in claim 8, wherein said recirculation line comprises a steady state cleaning line.

11. A method of purifying petroleum byproduct fluids comprising the steps of:
    inflowing petroleum byproduct fluid to a purification housing;
    dividing said housing into small, discrete sections;
    voltaically inspissating said petroleum byproduct fluid with at least one plate;
    pumping said petroleum byproduct fluid through said small, discrete sections in a meandering manner that alternates between anodic and cathodic voltage inspissation plates in a serpentine fashion as said petroleum byproduct is contained to pass through said purification housing;
    outflowing said petroleum byproduct fluid;
    recirculating said petroleum byproduct fluid back to an entrance of said purification housing;
    diffusing gas from said petroleum byproduct fluid;
    decanting said fluid;
    centrifuging said fluid; and
    interchanging voltaic inspissation plates, wherein said step of interchanging voltaic inspissation plates comprises the step of interchanging solids voltaic inspissation plates with diamond mesh voltaic inspissation plates.

12. A method of purifying petroleum byproduct fluids as in claim 11, further comprising the step of steady state cleaning said housing.

13. An electrocoagulative petroleum byproduct fluid purification system comprising:
    a petroleum byproduct influent intake feed;
    a housing;
    a plurality of voltaic inspissation plates configured to direct flow to alternate between anodic and cathodic voltage inspissation plates in a serpentine fashion as said petroleum byproduct fluid is contained to pass through said housing;
    a petroleum byproduct effluent outlet; and
    a pH control.

14. An electrocoagulative petroleum byproduct fluid purification system as in claim 13, wherein said plurality of voltaic inspissation plates is selected from the group consisting of: solids plates and diamond mesh plates.

15. An electrocoagulative petroleum byproduct fluid purification system as in claim 13, and further comprising an external gas hydrogen partial pressure control.

16. An electrocoagulative petroleum byproduct fluid purification system as in claim 13, wherein said pH control comprises an alkalizer.

* * * * *